(12) United States Patent
Hamahashi et al.

(10) Patent No.: US 7,460,702 B2
(45) Date of Patent: Dec. 2, 2008

(54) ENTROPY FILTER, AND AREA EXTRACTING METHOD USING THE FILTER

(75) Inventors: Shugo Hamahashi, Tokyo (JP); Shuichi Onami, Tokyo (JP); Hiroaki Kitano, Kawagoe (JP)

(73) Assignee: Japan Science and Technology Corporation, Saitama (JP)

( * ) Notice: Subject to any disclaimer, the term of this patent is extended or adjusted under 35 U.S.C. 154(b) by 757 days.

(21) Appl. No.: 10/433,463

(22) PCT Filed: Nov. 13, 2001

(86) PCT No.: PCT/JP01/09901

§ 371 (c)(1),
(2), (4) Date: May 30, 2003

(87) PCT Pub. No.: WO02/45021

PCT Pub. Date: Jun. 6, 2002

(65) Prior Publication Data

US 2004/0028273 A1 Feb. 12, 2004

(30) Foreign Application Priority Data

Dec. 1, 2000 (JP) ............................. 2000-367632

(51) Int. Cl.
*G06K 9/00* (2006.01)
*G06K 9/66* (2006.01)
(52) U.S. Cl. ..................................... 382/133; 382/190

(58) Field of Classification Search .......... 382/168–172, 382/260, 128, 133
See application file for complete search history.

(56) References Cited

U.S. PATENT DOCUMENTS 5,046,118 A    9/1991    Ajewole et al. ................ 382/51
5,317,644 A *    5/1994    Kenyon et al. .............. 382/133

(Continued)

FOREIGN PATENT DOCUMENTS

EP    0 615 205 A2    9/1994

(Continued)

OTHER PUBLICATIONS

Sahoo et al; "Threshold selection using minimal histogram entropy difference"; Jul. 1997; "Society of Photo-Optical Intrumentation Engineers"; vol 37 No. 7.*

(Continued)

*Primary Examiner*—Jingge Wu
*Assistant Examiner*—Andrae S Allison
(74) *Attorney, Agent, or Firm*—Ladas & Parry, LLP

(57) ABSTRACT

A smooth portion is efficiently extracted from an image. There is provided an entropy filter in which a noted pixel (x, y) is determined in an original image, said image is partitioned by a window of size (width, height)=(A, B) from the noted pixel, entropy of the partitioned window is calculated, and obtained entropy value is saved on the coordinates (x, y) of a resulting image. Here, in a noted pixel (x, y), x is ranged from 0 to (an image width minus a window width) and y is ranged from 0 to (an image height minus a window height). By using an entropy filter, a smooth portion in image quality is extracted from an original image. A preferred example of the smooth portion is a cell nucleus.

7 Claims, 4 Drawing Sheets

U.S. PATENT DOCUMENTS

| | | | |
|---|---|---|---|
| 5,502,710 A | 3/1996 | Washizawa et al. | 369/124 |
| 5,790,692 A * | 8/1998 | Price et al. | 382/133 |
| 5,848,177 A * | 12/1998 | Bauer et al. | 382/128 |
| 6,956,961 B2 * | 10/2005 | Cong et al. | 382/133 |
| 7,110,584 B2 * | 9/2006 | Onami et al. | 382/128 |
| 2003/0068085 A1 * | 4/2003 | Said | 382/170 |

FOREIGN PATENT DOCUMENTS

| | | |
|---|---|---|
| JP | 05-264232 | 10/1993 |
| JP | 06-113697 | 4/1994 |
| JP | 06-290269 | 10/1994 |

OTHER PUBLICATIONS

Wong et al, "A gray-level threshold selection method based on maximum entropy principle"; Systems, Man and Cybernetics, IEEE Transactions on Publication Date: Jul./Aug. 1989, vol. 19, Issue: 4, On pp. 866-871☐☐.*

Althouse et al, "Image segmentation by local entropy methods", 1995 International Conference on Image Processing (ICIP'95)—vol. 3 p. 3061.*

Chisholm, "Cell Lineage", 2000, The Encyclopedia of Genetics, Academic Press.*

* cited by examiner

ENTROPY FILTER, AND AREA EXTRACTING METHOD USING THE FILTER

FIELD OF THE INVENTION

The present invention relates to a filter for extracting a smooth area in image quality or coarse area in image quality from an image, and to an area extracting method for efficiently extracting a smooth area in image quality or coarse area in image quality from an image. In the specification, the present invention will be explained on a nucleus extraction from a cell image taken by a Nomarski DIC microscope (hereafter referred to as a "Nomarski microscope") as a preferred example. The technique employed by the present invention is not limited to an image taken by the Nomarski microscope nor a nucleus extraction from a cell image but can widely be applied to a feature extraction from an image and image recognition.

BACKGROUND OF THE INVENTION

There is an occasion to extract a nucleus area from a cell image. Specifically, it is important to efficiently recognize a nucleus area from the obtained image in order to construct the cell lineage of the nematode. The so-called Nomarski microscope is used to obtain a cell image. According to the Nomarski microscope, the external shape and distribution of contents of a transparent subject are observed as light and dark images. Biologically, a cell content (nucleus) and an external shape (cell membrane), both transparent when using a common optical microscope, can be observed as images of light and dark.

Conventionally, a plurality of image processing algorithms are used for extracting a nucleus area from an image taken by the Nomarski microscope. These image processing algorithms comprise an approach for detecting an area, where the fine brightness variation in the image is poor, as the nucleus, or an approach for extracting a portion, in which the change in the intensity is large in a wide range along the incident angle of the light, as the nucleus. The former is exemplified by using a filter obtained by a combination of a Kirsch template type edge detection operator with a moving average, or a filter binarizing the output of a Prewitt template type edge detection operator and applying a distance transform. For the latter, a filter for taking a difference in a sum of intensity value of a predetermined top and bottom pixel along a seeming angle of light is adopted.

However, the nucleus detection by these image processing algorithms is not perfect, and therefore, an area recognized by any one of three types of algorithms is determined as a nucleus area as a conclusion of a whole image processing system, which results in a complicated nucleus extraction operation.

In a cell image taken by the Nomarski microscope, a cytoplasmic portion is coarse in image quality, while a nucleus area is relatively smooth in image quality. A method for extracting a smooth area as a nucleus from an image is studied using differences in image quality.

An object of the present invention is to efficiently extract a smooth or coarse portion in image quality from an image.

Another object of the present invention is to provide a filter that is capable of extracting a smooth or coarse portion in image quality from an image.

DISCLOSURE OF THE INVENTION

A filter of the present invention is characterized in that entropy of a small section including a noted pixel (x, y) is calculated, and the noted pixel (x, y) is renewed by an obtained entropy value.

Preferably, the filter is a filter in which a start point (x, y) is determined in an original image, the image is partitioned by a window of size (width, height)=(A, B) from the start point, entropy of the partitioned window is calculated, and an obtained entropy value is saved on the coordinates (x, y) of a resulting image. In a desirable example, in a start point (x, y), x is ranged from 0 to (an original image width minus A) and y is ranged from 0 to (an original image height minus B).

According to an area extracting method employed by the present invention, partitioning the image by a small window and scanning the image with calculating entropy of the window facilitates the extraction of smooth portions from the image. The binarizing processing of the filtered image yielded by the entropy filter with a threshold allows good extraction of the smooth portion from the image. In the present specification, "smooth" is defined as the difference in pixel values being relatively small, in other words, an intensity value of the pixel is relatively even. In contrast, "not smooth" is defined as the difference in pixel values being relatively large, in other words, an intensity value of the pixel is relatively uneven. The intensity value in a gray scale image is the value representing monochromic intensity. The intensity value in a color image is the value representing each intensity of R, G, and B. Whether "the difference in pixel values is small or large" in the color image is determined according to the proviso that, the closer the combination of R, G, and B, the smaller the difference, while the more dissimilar the combination of R, G, and B, the larger the difference.

According to the present invention, it is easy to distinguish a smooth portion in image quality and a non-smooth portion (coarse in image quality) from an image. The invention is not influenced by light and dark of the image. Therefore, the present invention effectively works for an image taken by an autoexposure type automatic photographing apparatus. In a widely used automatic photographing system by the Nomarski microscope, an image is taken by the autoexposure camera so that variances in light and dark are occurred depending on images. The present invention is not influenced with the occasion. An image that is an object of the extracting method of the present invention can either be an image in monochrome or color.

According to the present invention, a sensitivity of the entropy filter can be varied at will by changing a window size. The entropy filter can be operated in accordance with a situation where an object is a very small portion, or a situation where an object is a whole image. By doing this, the entropy filter can conform to a situation where a magnification of microscope is changed. Also, the entropy filter effectively works in a situation where a biological object changes. Specifically, in a situation where an image object is a living organism, a degree of coarseness of a cytoplasmic, and a degree of smoothness of a nucleus area may vary depending upon variation of the biological object. However, it is possible to deal with the changes by selecting a preferred window size.

The use of the entropy filter of the present invention is not limited to extracting a smooth portion in image quality from an image. The entropy filter may be applied for autofocus detection by utilizing the fact that an image becomes blurred when the image is out of focus.

PREFERRED MODE FOR CARRYING OUT THE INVENTION

Figure 2:
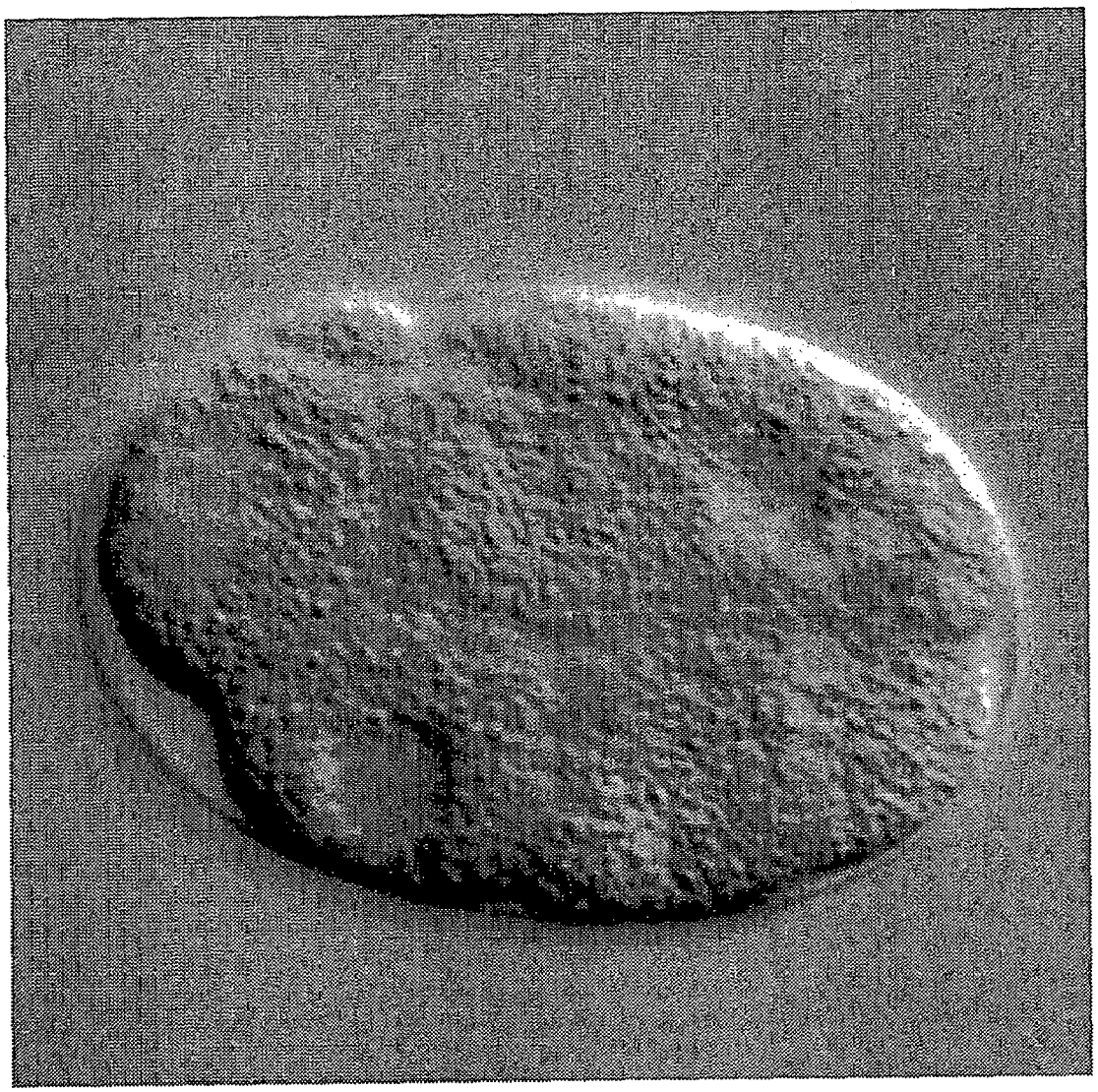
FIG. 2 is a microscopic image of a cell.

An area extracting method of the present invention will be described based on a nucleus extraction from an image of a *C. elegans* early embryo taken using the Nomarski DIC microscope as a preferable example. FIG. 2 is the microscopic image of a *C. elegans* early embryo in which the cytoplasmic portion (which is coarse in image quality) shows a relatively large difference in gray level, while the nucleus portion (which is relatively smooth in image quality) shows a relatively small difference in gray level.

The entropy filter employed by the present invention is a filter for efficient extraction of the smooth portion from the image. This employs the property that the cytoplasmic portion is coarse in image quality, while, in contrast, the nucleus portion is relatively smooth in image quality.

Figure 1:
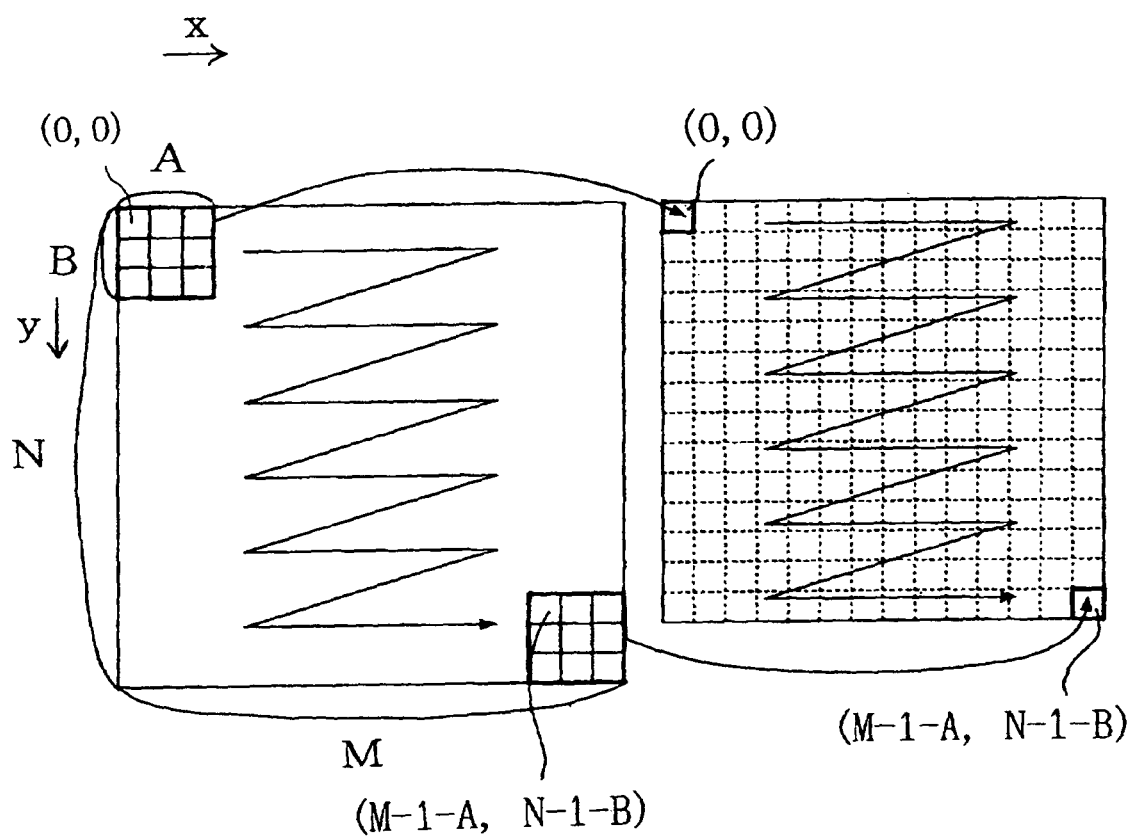
FIG. 1 is a view explaining an entropy filter.

A left drawing of FIG. 1 shows a digital image data with a size of M×N pixels, an upper left is (0, 0) and a lower right is (M−1, N−1). A start point (x, y) is determined in the original image with a size of M×N pixels where x is ranged from 0 to (an image width minus a window width) and y is ranged from 0 to (an image height minus a window height).

Next, the image is partitioned by a window of size (width, height)=(A, B) from the noted pixel selected as the start point. Entropy of the partitioned window is calculated and the obtained entropy value is saved on the coordinates (x, y) of a resulting image as a new pixel value. In the depicted drawing, x is in a range from 0 to (M minus one minus A), and y is in a range from 0 to (N minus one minus B).

Entropy is calculated based on the following equation (1).

$$(\text{entropy value}) = -\sum_{l=l_{min}}^{l_{max}} P(l)\log P(l) \quad (1)$$

In equation (1), P(l) is a normalized intensity histogram produced by obtaining an intensity histogram H (1) for the image area whose characteristics to be measured (if an intensity level is L, 1=0, 1, 2, ..., L−1), followed by dividing the frequency of each intensity level by the total frequency (a pixel number of the image area), and then normalizing to make the total pixel number 1.0. The nucleus area is discriminated from the cytoplasmic area by referring to the entropy value calculated using equation (1).

In the embodiment, the image is partitioned by a window of size (width, height)=(A, B) from the noted pixel selected as the start point and entropy of the partitioned window is calculated. However, the image may be partitioned by a window of size (width, height)=(A, B) that contains a noted pixel (x, y) not in an upper left corner, and entropy of the partitioned window may be calculated. In this case, the ranges of x and y of the noted pixel (x, y) differ from those in the figure. For example, the noted pixel (x, y) may be coordinates from (1, 1) to (M minus A, N minus B).

The operation involving scanning the original image with calculating entropy of a small section makes efficient extraction of the position of the nucleus possible. The entropy window size depends on the kind of microscope and magnification used. A good result was obtained by scanning an image area window of 6 pixels×6 pixels to 20 pixels×20 pixels, (preferably 10 pixels×10 pixels or 12 pixels×12 pixels). In this case, the pixel of the nucleus area ranges according to factors such as cell division from about 1000 pixels to 10000 pixels. The foregoing window size and number of pixels for the nucleus area are merely given as examples.

Figure 3:
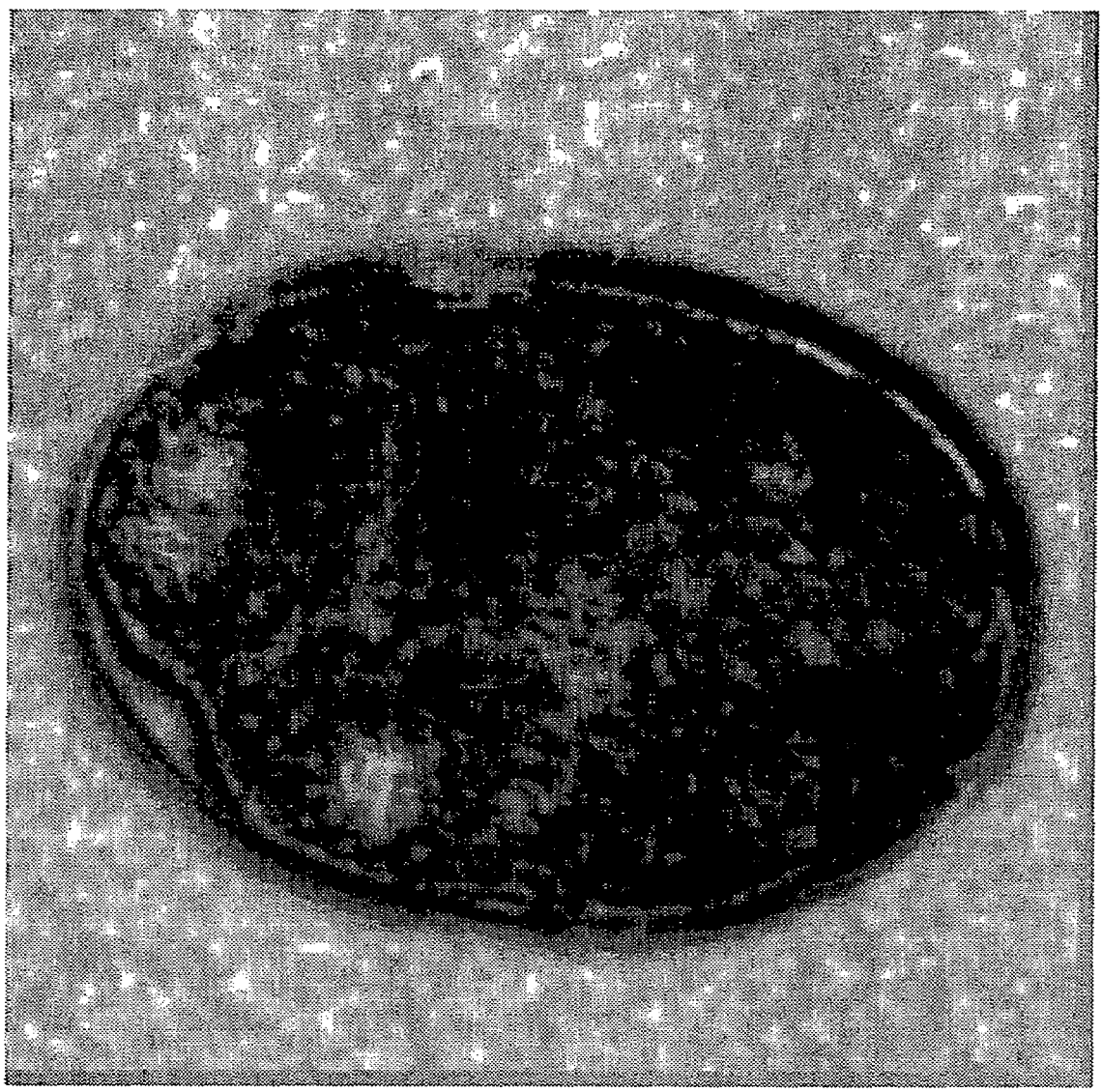
FIG. 3 is a filterd image of the image shown in FIG. 2 processed by the entropy filter.
Figure 4:
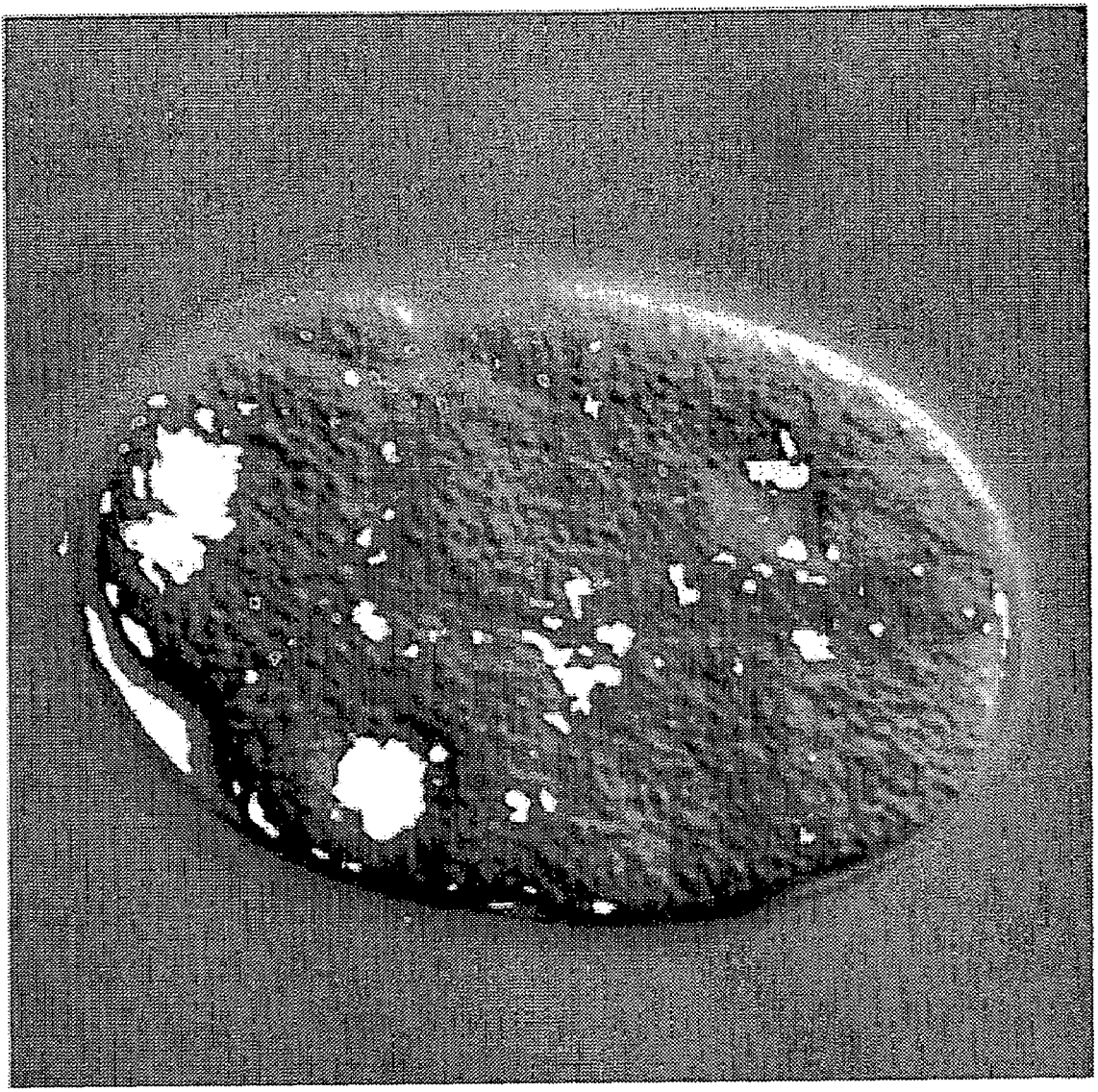
FIG. 4 is a product of superimposing the resultant image followed by threshold processing, on the microscopic image of FIG. 2.

FIG. 3 is a processed image of the cell image shown in FIG. 2 after processing using the entropy filter. FIG. 4 is the product of superimposing the resultant image of FIG. 3, which has been processed by the entropy filter followed by threshold processing, on the microscopic image of FIG. 2. In this way, a nucleus area that is smooth in image quality is extracted from a cell image.

A preferred embodiment of the present invention is explained in conjunction with a nucleus extraction from an image of a *C. elegans* early embryo taken by the Nomarski DIC microscope. However, the present invention is not limited to a nucleus extraction from a cell image. An object image is also not limited to an image taken by the Nomarski microscope but can be an image taken by other microscopes, and the present invention can even be applied to any image dealt with a computer.

Automatic focus detection using the entropy filter will be explained. Automatic focus detection is generally obtained using contrast. However, in an image taken by the Nomarski microscope, the method using contrast does not work well. The entropy filter can be applied to automatic focus detection by using the fact that an image becomes blurred when the image is out of focus. This employs the property that an image becomes clear in proper focus (increase in entropy) while an image becomes smooth out of focus (decrease in entropy). When an object image (a cell image for example) is always the same, determination as to whether an image is focused can be anticipated according to variation range of an entropy value. A method of automatic focus detection is as follows. Firstly, an entropy value of an obtained image is calculated by gradually changing a focus. The window size is fixed at this time. Next, examine each calculated entropy value of one piece of image. Then, an image is determined as being in proper focus if a relatively large entropy value is obtained.

INDUSTRIAL APPLICABILITY

The entropy filter can efficiently extract a smooth portion from an image without being influenced by brightness and darkness and/or monochrome/color of an image. Preferably, the entropy filter can be applied to a nucleus extraction from a cell and therefore applied to an image processing device of an automatic cell lineage construction system of a *C. elegans*. The entropy filter can also be applied to autofocus of photograph.

What is claimed is:

1. A method of detecting a smooth area or coarse area in image quality from an original image by processing the original image using an entropy filter, said entropy filter comprising a computer and software embodied on a computer-readable memory for implementation by the computer, comprising the steps of:

providing the original image to the computer, each pixel of said image having an intensity and a location within the image (x, y);

calculating entropy of a small section of said image whose location in the image is derived from the location of a noted pixel (x, y) located within the small section to obtain an entropy value for said pixel (x, y) and obtaining the entropy value for said each pixel of said image, wherein entropy is calculated based on the following equation (1):

$$\text{(entropy value)} = -\sum_{l=l_{\min}}^{l_{\max}} P(l) \log P(l) \quad (1)$$

where P(l) is a normalized intensity histogram obtained by dividing the frequency of each intensity level by the total number of frequencies, renewing the intensity of said each pixel of said image by the entropy value, and binarizing said renewed intensity of said each pixel using a threshold to obtain a binarized image including one or more detected smooth areas or coarse areas.

2. The method of claim 1, wherein said small section is defined by determining a start point (x, y) in said image, followed by partitioning said image with a window of size (width, height)=(A, B) from said start point, wherein entropy of the partitioned window is calculated, and an obtained entropy value is saved on the coordinates (x, y) of a resulting image, and wherein x is ranged from 0 to (an image width minus a window width) and y is ranged from 0 to (an image height minus a window height).

3. The method of claim 1, wherein the original image is a cell image and the smooth area is a nucleus, and wherein the nucleus is detected from the cell image.

4. The method of claim 3, wherein the original image is taken by a Nomarski microscope.

5. A method of detecting a nucleus area from a cell image by a computer, comprising:

providing the cell image to the computer, each pixel of said cell image having an intensity and a location within the image (x, y);

calculating entropy of a small section of said image whose location in the image is derived from the location of a noted pixel (x, y) located within the small section to obtain an entropy value for said pixel (x, y) and obtaining the entropy value for said each pixel of said image, wherein entropy is calculated based on the following equation (1):

$$\text{(entropy value)} = -\sum_{l=l_{\min}}^{l_{\max}} P(l) \log P(l) \quad (1)$$

where P(l) is a normalized intensity histogram obtained by dividing the frequency of each intensity level by the total number of frequencies, renewing the intensity of said each pixel of said image by the entropy value, and binarizing said renewed intensity of each pixel using a threshold to obtain a binarized image including one or more detected nucleus areas.

6. The method of claim 5, wherein said small section is defined by determining a start point (x, y) in said image, followed by partitioning said image with a window of size (width, height)=(A, B) from said start point, wherein entropy of the partitioned window is calculated, and an obtained entropy value is saved on the coordinates (x, y) of a resulting image, and wherein x is ranged from a to (an image width minus a window width) and y is 7. The method of claim 5, wherein the original image is taken by a Nomarski microscope.

\* \* \* \* \*